Patented June 14, 1949

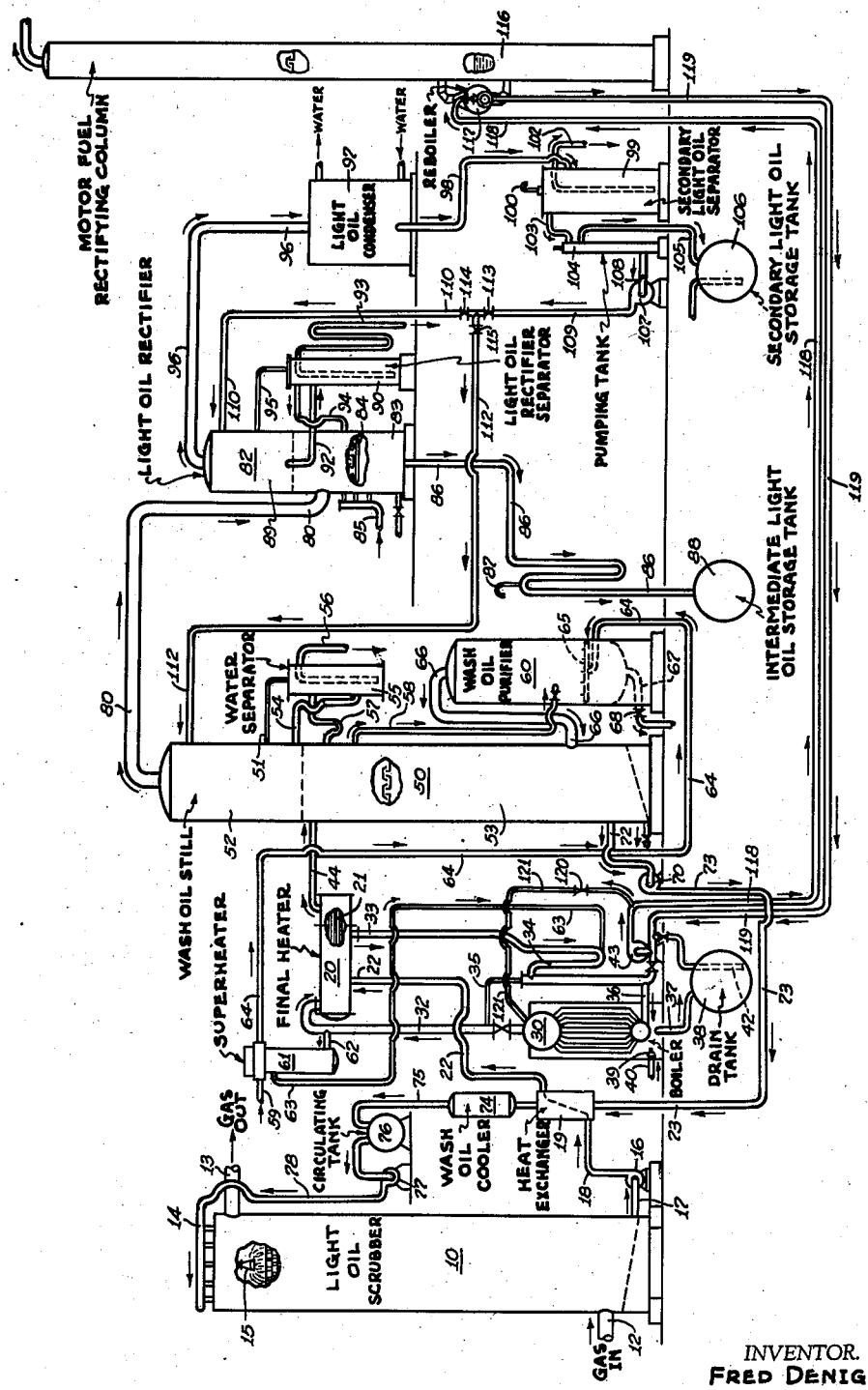

2,472,810

UNITED STATES PATENT OFFICE 2,472,810

RECOVERY OF LIGHT OIL FROM ABSORBENT

Fred Denig, Pittsburgh, Pa., assignor, by mesne assignments, to Koppers Company, Inc., a corporation of Delaware Application December 24, 1941, Serial No. 424,278

5 Claims. (Cl. 196—8)

The present invention relates in general to improvements in method and means for the recovery of light-oil vapors from gases, and the like, and more particularly relates to improvements in methods for the removal of light oil from absorbent agents, such, for example, as absorbent oils that are employed in light-oil recovery systems of by-product coke plants, for instance.

Customarily, light oil, comprising aromatic compounds such as benzene, its homologues and derivatives, is removed from gases produced by the destructive distillation of fuels, and the like, by scrubbing the same with a recycled absorbent oil followed by a step for stripping so-absorbed light oil from the said absorbent oil. In almost universal practice, the recovery of the absorbed light oil in such stripping step has hitherto been accomplished by preheating of the enriched absorbent oil with indirect steam to temperatures of about 100° C. to 140° C. and thereafter passing direct steam through the heated enriched oil, the direct steam functioning as a sweep gas or vapor. In certain instances, the preheating of the enriched absorbent oil has been accomplished by its heating by direct flames; such direct heating, however, often causes deterioration of the absorbent oil by local overheating due to skin effects on heater surfaces and the difficulty of equally distributing heat from such a source. Where high-temperature steam is employed as the preheating medium, high-pressure equipment is required to confine it at the required temperature and the use of such equipment also requires the services of highly-trained technicians. In addition, the possibility of ruptures in distribution pipes therefor in the light-oil recovery systems constitutes a serious fire hazard.

Amongst the objects of the present invention are novel and practical improvements in the described method, for recovery of light oil from gases, that provide means both for obtaining improved stripping of the enriched absorbent oil and consequently enhanced yields of light oil from systems employing such method, and for eliminating high pressures throughout the light-oil recovery system and also expensive equipment that employment of such pressures has heretofore necessitated.

A further object of the invention is the provision of a highly efficient light-oil recovery system that shows improved thermal efficiency.

The invention has for further objects such other improvements and such other operative advantages or results as may be found to obtain in the processes or apparatus hereinafter described or claimed.

It is well known to those skilled in the art that an improved stripping of enriched absorbent oil can be obtained in the said customary recovery method by elevating appropriately the temperature of preheating of the enriched absorbent oil which increases the efficiency of removal of absorbed light oil and consequently the absorptive capacity of the absorbent oil when it is recycled to the absorption step. Efficiency of absorbed light-oil removal also results from increasing the quantity of stripping steam. The former expedient of course requires steam at yet higher and more hazardous pressures and also more resistant and expensive equipment for its delivery, and both expedients are disadvantageous and are made unnecessary by the present improvements.

Briefly stated, in the method of the present invention, enriched absorbent oil issuing from the above-stated gas-scrubbing step of a light-oil recovery plant is heated to at least substantially about 200° C. by indirect contact with the vapors of a substance, or mixture of substances, of which its own boiling point at atmospheric pressure is at least above about the said temperature of 200° C., the so-heated enriched absorbent oil being then flowed through a stripping step where it is brought into direct contact with a small amount of steam for sweeping the absorbed light oil therefrom. The so-stripped light oil is removed as vapor and may be partially condensed and fractionated in a light-oil rectifier from which heavy solvent is flowed to storage, and the rectified light-oil vapors issuing therefrom are flowed to condensing means. The hot stripped absorbent oil may be cooled by oil-to-oil heat exchangers and by coolers and thereafter recycled to the gas scrubber for absorption of further quantities of light oil. In the practice, Dowtherm, which is a eutectic mixture of diphenyl and diphenyl oxide, has been found to be a useful material for the present purpose, but it is of course obvious that other organic substances or mixtures conforming to the above-stated characteristics are useful for the present purpose as well as also certain inorganic substances, for example, elemental mercury.

By means of the present improvement, it becomes advantageously practical, in a coke-plant light-oil recovery system, employing the usual high-boiling absorbent oils (normally employed absorbent oil, such as "straw" or wash oil, has a boiling range of about 280–380° C.) for extraction of the light oil from coke-oven gas, continuously to recondition by distillation a minor amount of the bulk of the recirculated absorbent oil with dry superheated steam of low pressures, for the purpose of maintaining those constituents, which accumulate in the oil and otherwise gradually cause an increase in its viscosity and also troublesome emulsifications thereof, at a level whereat well-known inconveniences resulting from their presence is obviated.

In the accompanying drawing forming a part of this specification and showing for purposes of exemplification a preferred apparatus and method in which the invention may be embodied and practiced but without limiting the claimed invention specifically to such illustrative instance or instances, the single figure is a diagrammatic elevational view of apparatus, parts broken away, for the recovery of light oil from gas in accordance with the present invention.

Referring to the drawing, the light-oil scrubber 10 is disposed in a stream of gas issuing from a by-product coke-oven plant. Gas containing light-oil vapors enters the said scrubber at inlet-gas pipe 12, ascends through hurdles within said scrubber 10 and gives up light-oil vapors to absorbent oil, that is introduced into the top of said scrubber, said gas thereafter leaving the scrubber through pipe 13 in the direction indicated by the arrows in the drawing. The said absorbent oil is delivered to the top of the light-oil scrubber by spray-header delivery pipe 14 and is sprayed thereinto by a plurality of nozzles 15, and flows downwardly over said hurdles countercurrently in respect of the gas flow, in the customary manner of light-oil scrubber operation.

The light-oil enriched absorbent oil is withdrawn from the bottom of the scrubber by pump 16 through pipe 17 and is forced by said pump through line 18 to oil-to-oil heat exchanger 19 wherein the said enriched absorbent oil is heated by indirect contact with hot stripped wash oil coming from the wash-oil still. Previous difficulties encountered in the use of an oil-to-oil heat exchanger are, in consequence of the present invention, substantially eliminated, as above mentioned, by hereinafter described means that it provides for continuously removing, from recirculated wash oil, those contaminants which would otherwise form deposits on the heat-exchanger tubes and thereby seriously interfere with efficient heat transfer.

Enriched wash oil, having been partially preheated in heat exchanger 19, and while still under pressure of pump 16, passes through feed-line 22 into final heater 20. Herein, the said wash oil is flowed inside preheater-tubes 21 where it is heated by indirect contact with saturated vapors of Dowtherm issuing from boiler 30 therefor, and flowing to said final heater through vapor-riser 32. The cooled Dowtherm is returned from the final heater through pipe line 33, the lower portion of which is U-shaped to form a seal 34 that is vented to vapor-riser 32 by pipe 35. From the said seal 34 the condensed Dowtherm can be returned to the boiler 30 through return pipe 36 whence it can be drained if required through drain line 37 to the boiler drain tank 38 for purposes of storage.

The high-temperature boiler 30 wherein is produced at substantially atmospheric pressure the saturated vapors of Dowtherm, or its equivalent, to preheat the enriched absorbent oil, is advantageously of smaller size than a steam boiler would be that were adapted for delivering an equivalent amount of heat to the light-oil recovery system. Boiler 30 is heated directly by gas burned at nozzles 39 and delivered thereto through gas pipe 40. Liquid Dowtherm, that may be required for make-up purposes, is drawn from storage through pipe 42 by pump 43 which is also employed to circulate hot liquid Dowtherm to other features of equiment for purposes hereinafter described. Both heated liquid Dowtherm and its vapors are variously employed at substantially atmospheric pressure to supply heat for performing hereinafter described operations in the complete process, thereby providing means for the efficient recovery, and distillation into preferred fractions, of light oil without the use of high-pressure steam or costly apparatus required for employing the latter.

Hot enriched wash oil is fed from final heater 20 through still feed line 44 to an intermediate bubble-cap tray of a plurality of superposed trays in wash oil still 50. The said wash oil still 50 is functionally divided into two communicably interconnected sections by means of piping that diverts liquids collected, on one of said intermediate trays, away from the still column to a water separator 55, liquid level on such tray being controlled by appropriate disposition of a weir. The upper section 52 of still 50 and which is liquid-sealed, but not vapor-sealed, from the lower section 53, so as to prevent the direct flow of liquids to the said lower section, contains horizontally superposed, bubble-cap trays wherein light oil and wash-oil vapors are fractionated. Light oil that is delivered for purpose of reflux to said upper section 52 to assist in removal of the unusually high proportion of wash-oil vapors that reach the upper part of the still in consequence of the high temperature at which the present process of stripping is performed, flows downwardly and countercurrently to the flow of said vapors. Condensate, comprising oil and water that collects on the lowest tray of the upper section, is flowed through separator-feed line 54 to a water separator 55 of conventional design wherein the water-fraction is removed by a gravity separation from the oil phase and is discarded through drain line 56. The said separator is vented to the still column by vent pipe 51. The oil from which most of the water has been thus removed is flowed through separator return-line 57 to the top tray of said lower section 53 down through which the said oil flows while being substantially completely stripped of its light-oil components by direct contact with countercurrently flowing wash-oil vapors and steam.

A portion of the wash oil is withdrawn from an upper bubble-cap tray of the said lower section 53 and is transferred by pipe 58 to a wash-oil purifier 60, wherein low-pressure superheated steam is used directly as a sweep-vapor to vaporize wash oil from its non-volatile contaminants. Low-pressure steam from any source is supplied through pipe 59 to a superheater 61 wherein the said steam is superheated by indirect contact with Dowtherm vapors that are supplied thereto from vapor-riser 32 through pipe 62 and are returned through return line 63 to pipe 33 at the base of U-shaped seal 34. The thus-superheated steam flows through steam-line 64 to the said wash-oil purifier 60 and is discharged thereinto from its cracker pipe 65. The superheated steam of advantageously high temperature and low pressure vaporizes wash oil delivered into the purifier 60 and thus removes it from sludge and like non-volatile contaminants. Wash-oil vapors, some light-oil vapors, and steam, which subsequently acts as a sweep-vapor to volatilize light oil from wash oil, pass through wash-oil-vapor pipe 66 to the base of the wash oil still 50 wherein the said vapors are employed for stripping absorbed light oil from the countercurrently flowing wash oil in the stripping section 53 of the still column, the wash-oil vapors being condensed and so returned to the recycled body thereof, whereas the light-oil vapors and steam continue to the upper part of the still. The so-separated non-volatile impurities of the wash oil are periodically drained from the said purifier through drain line 67 by operation of valve 68 disposed therein.

Hot stripped wash oil that collects in the lower part of still-section 53 is drained therefrom through pipe 72 and is returned by pump 70 through line 73 to the oil-to-oil heat exchanger 19 wherein said stripped wash oil is cooled by indirect heat exchange with inflowing enriched wash oil. The stripped wash oil is further cooled in wash-oil cooler 74, by indirect contact with water, from which it is flowed through pipe 75 to a circulating tank 76. From this said tank wash oil is pumped by pump 77 through pipe 78 to the aforementioned spray header delivery pipe 14 from which the wash oil is sprayed by nozzles 15 into contact with further quantities of gas, thereby completing the cycle of the recirculated wash oil. The high temperature to which the inflowing enriched wash oil is preheated and the maintenance of a high temperature within the wash-oil still provide an efficient and nearly complete removal of light oil from the said enriched oil, even though employing, as hereinbefore noted, no high-pressure equipment, and such complete removal of light oil from wash oil in turn provides for improved efficiency of scrubbing, with the so-stripped wash oil, of the light oil from the gas.

Light-oil vapors substantially free of wash-oil vapors pass from still 50 through still-vapor line 80 to light-oil rectifier 82. The said light-oil rectifier is composed of two sections of superposed bubble-cap trays. The one or more trays of its lower section 83 are equipped with steam coils 84, steam being supplied to said coils through line 85 to separate by distillation the lower-boiling light-oil constituents from those higher-boiling ones entering said rectifier. The said higher-boiling constituents, that are called intermediate light oil and comprise the xylenes, heavy solvent, and the like, drain from the rectifier through pipe 86, that is provided with a seal and with a vent pipe 87, and flow to intermediate light-oil storage tank 88.

Vaporized lower-boiling light-oil constituents rise from said stripping section 83 into an upper, rectifying section 89 that also comprises a plurality of bubble-cap trays, the said rising vapors passing thereinto through liquid retained on a dividing bubble-cap tray which has provision to allow passage of vapors therethrough but which has no downcomer for the return to a lower tray of the liquid retained thereon but instead is supplied with an overflow weir and a separator feed line 92 for draining liquid from the tray to a water separator 90 of conventional design similar to that of previously described water separator 55. Liquid condensing on the lowest bubble-cap tray of rectifying section 89 is transferred through the separator feed line 92 to the said separator 90 wherein water that concentrates on the said lowest tray is removed by a separation from a light-oil phase and is discarded through drain pipe 93. Supernatant light oil is returned to the said rectifier 82 through separator return-line 94. The separator 90 is vented to the rectifier 82 by vent pipe 95. The said lower-boiling light-oil components, that are called secondary light oil and comprise mainly benzene and toluene, are rectified in said rectifying section 89 in the presence of a reflux of such secondary light oil and flow in vapor state through vapor line 96 to a light-oil condenser 97 wherein they are condensed. The condensed secondary light oil comprising the said lower-boiling components such, for example, as benzene, is continuously discharged from the said light-oil condenser through line 98 to secondary-light-oil separator 99 that is vented to atmosphere by vent pipe 100 and wherein further quantities of water are allowed to settle from the said light oil and be siphoned therefrom by drain pipe 102. Secondary light oil, relatively free of water, is withdrawn from the separator 9 through pipe 103 to a pumping tank 104 from which a major portion of said light oil is continuously discharged through pipe 105 to a secondary light-oil storage tank 106. Another portion of the said secondary light oil is continuously withdrawn by pump 107 from the pumping tank 104 through pipe 108 whence it is returned through pipe 109 and reflux lines 110 and 112 to the light-oil rectifier and wash-oil still respectively, wherein the said light oil is employed as reflux. That rate of flow of the reflux maintaining a preferred reflux ratio in each column is regulated by the adjustment of valves 113, 114 and 115 at the junction of the above-mentioned reflux lines.

Intermediate and secondary light oils that are recovered by the above-described cyclic absorption-and-stripping process are stored in the said storage tanks for any preferred disposition such, for example, as customary treatment to produce pure products. For example, the so-produced secondary light oil can be distilled in motor fuel rectifying column 116 to produce a high-grade motor-benzol. The rectification of secondary light oil as practiced by the present improvement for production of motor-benzol further emphasizes the important utility of such high-boiling substances as Dowtherm in the recovery and refining of crude light oil. In this case, the motor fuel reboiler 117 of the said column 116 is heated by hot liquid Dowtherm that is circulated by pump 43 through the circuit comprising the said pump, pipe 118 to the reboiler, and pipe 119 in return therefrom. The temperature of the so-circulated Dowtherm liquid is maintained at a preferred level, which in one example of operation was at about 160° C., by adjustment of control valve 120 in pipe 121 connecting the said pipe 118 to the Dowtherm boiler 30, which said adjustment can be controlled automatically by means of apparatus responsive to changes in temperature on a tray of rectifying column 116 to maintain a preferred temperature in the latter. When the temperature of the so-circulated liquid Dowtherm drops below the preferred level, hot liquid Dowtherm can be pumped from condensate return pipe 33 and seal 34, into the said circuit so as to raise the temperature of the partially-cooled circulated liquid the required degree, such admission of hot Dowtherm liquid into the closed liquid system being permitted by the efflux therefrom of substantially an equivalent volume of the partially cooled circulated Dowtherm through the pipe 121 by opening the control valve 120 therein.

In a plant constructed and operated according to the principles of the present invention, coke-oven gas was scrubbed at temperatures from 25° to 30° C. by a petroleum wash oil flowing countercurrently to the flow of the said gas and down over banks of hurdles contained in scrubber apparatus disposed in series in respect of the said gas flow. Customarily, about 150 gallons of wash oil per ton of coal carbonized are circulated.

The benzolized wash oil was thereafter heated in an oil-to-oil heat exchanger 19, to approximately 150° C., and was thereafter heated to about 205° C. in a preheater 20, by vapors of Dowtherm A (a eutectic mixture of 26.5% diphenyl and 73.5% diphenyl oxide which boils at 258° C. at atmospheric pressure). The relatively high temperature of the Dowtherm vapors even at atmospheric pressure provides sufficiently high temperature-differential between its vapor and the benzolized wash oil that the latter can be preheated to at least about 200° C. in a final heater of approximately one-third the size formerly required for preheating at the same rate a given quantity of benzolized wash oil to the usual lower temperature of about 140° C. The operation of the Dowtherm boiler is substantially automatic and since its operating gauge pressure is but three to five pounds per square inch, a licensed engineer is not required for its operation.

If, as a result of the high-temperature heating of a given wash oil, deterioration thereof is observed, a wood distillate can be added that materially inhibits such deterioration.

The raising of the temperature of the benzolized wash oil to 200° C. from the more customary 120° C. increases by as much as five fold the vapor pressure of absorbed light oil, when it is contained in the wash oil to the extent of about 1.5% of the same by volume. This increased vapor pressure facilitates the removal of the light-oil constituents to such degree that a greatly reduced volume of stripping steam is required therefor. In addition to the resultant saving in steam costs, the decreased requirement of steam makes possible the use of an importantly smaller still for its supplying and for correspondingly smaller condensers, water separators, and like related equipment of the system. A further advantage resides in the resultant decrease in the volume of water condensed with the light-oil vapors, such water presenting an annoying disposal problem because of its tendency to extract phenols present in the light oil.

In the light-oil rectifier 82, which in the given example of operation showed a top vapor temperature of approximately 90° C., the light-oil vapors effluent to the wash-oil still 50 are rectified with an added reflux of secondary light oil thereby to separate the said light-oil vapors into secondary and intermediate light-oil fractions. The distillation range of both the intermediate and of the secondary light-oil fractions and consequently their contents of intermediate-boiling constituents can be controlled by the quantity of steam supplied to the said rectifier heating-coils and by this means preferred constituents of said intermediate, such, for example, as styrene, can be preferentially directed to either the one or the other said light-oil fraction.

It is an obvious and economically important advantage of the present invention that the high yields and efficient operation of the method thereof can be obtained by low-cost installations in plants having a fixed boiler capacity that would be inadequate for delivery of additional quantities of steam to a light-oil recovery system.

In further demonstration of the utility of employing at novelly high temperature vapors of Dowtherm, or the like, in a system for the recovery of light oil from coke-oven gas it should be also noted that the low-pressure steam employed for stripping purposes in the wash-oil still 50 and the light-oil rectifier 82 can also be generated by waste heat from the Dowtherm vapor.

It is of further noteworthy advantage in the operation of the novel process that the delivery of steam in dry, superheated form to the wash-oil purifier and to the portion of wash oil therein avoids frothing or bumping within the purifier, such dry, superheated steam having sufficient sensible heat substantially completely to volatilize wash oil from its undistillable contaminants without condensation of the said inflowing steam.

The invention as hereinabove set forth is embodied in particular form and manner but may be variously embodied within the scope of the claims hereinafter made.

I claim:

1. A process for the recovery of light-oil vapors from coke-oven gas containing the same by means of an absorbent oil, that is recycled in sequence through a step for absorbing light-oil vapors from said coke-oven gas and a step for stripping so-absorbed light oil from said absorbent oil by direct contact with steam, and that in the course of said recycling accumulates undistillable contaminant which reduces its effectiveness in said absorption step, said process comprising the steps of: prior to introduction into said stripping step, heating absorbent oil effluent from said absorption step to a temperature of at least about 200° C. by indirect contact with vapor of a boiling substance that is at substantially atmospheric pressure and at a temperature of at least about 200° C. and also superheating said steam at low pressure by indirect contact with vapor of said boiling substance, introducing so preheated absorbent oil into said stripping step and withdrawing from near the absorber oil inlet end thereof a minor portion of the bulk thereof into a distillation step for the same, and flowing said superheated steam first into direct contact with said minor portion of hot absorbent oil thereby simultaneously volatilizing without substantial condensation of the steam absorbent-oil constituents from the minor portion, rejecting absorbent-oil residuum from said minor portion distillation, thereafter introducing the steam and volatilized absorbent oil from the minor portion distilling step into said stripping step, and effecting the stripping therein substantially solely with the stripping steam and vapors from the aforesaid minor portion distillation prior to withdrawal of the said minor portion from the stripping step to the minor portion distillation step.

2. In a process for the recovery of light-oil vapors from coke-oven gas containing the same by means of an absorbent oil, that is recycled in sequence through a step for absorbing light-oil vapors from said gas and a step for stripping so-absorbed light oil from said absorbent oil by direct contact with steam, and that in the course of said recycling accumulates undistillable contaminant which reduces its effectiveness in said absorption step: reconditioning said contaminants-containing absorbent oil by the steps of, preheating the absorbent oil from the absorption step prior to entering the stripping step to a temperature of 200° C. by indirect contact with a vapor of an organic compound that is at a temperature of at least 200° C. and at atmospheric pressure and of which its own boiling point at atmospheric pressure is above about 200° C., withdrawing from near the absorption oil entrance end of said stripping step a minor portion of the recycled wash oil that has been previously preheated to at least about 200° C. and flowing therethrough a quantity of low pressure superheated steam that is substantially sufficient to volatilize the oily portion of the so-withdrawn absorbent oil and to leave said contaminants as residuum, and flowing such steam and volatilized constituents into the absorbent oil exit end of such stripping step, such steam being sufficiently superheated to avoid condensation in contact with said withdrawn absorbent oil thereby to avoid bumping and frothing of the latter, and effecting the stripping in the stripping section substantially solely by the steam and volatile portions from such minor portion.

3. In a process for the recovery of light-oil vapors from coke-oven gas containing the same by means of an absorbent oil, that is recycled in sequence through a step for absorbing light oil vapors from said coke-oven gas and a step for stripping so-absorbed light oil from said absorbent oil by direct contact with steam, and that in the course of said recycling accumulates undistillable contaminant that reduces its effectiveness in said absorption step, said process comprising, preheating absorbent oil effluent from said absorption step to a temperature of at least about 200° C. by indirect contact with vapor of a boiling substance that is at substantially atmospheric pressure and at a temperature of at least about 200° C. and also superheating said steam at low pressure by indirect contact with vapor of said boiling substance, the steps of: introducing so-preheated absorbent oil into said stripping step and withdrawing from near the stripped vapor outlet end thereof a minor portion of the bulk thereof into a distillation step for the same, and flowing said superheated steam into direct contact with said minor portion of hot absorbent oil and thereby volatilizing, without substantial condensation, absorbent-oil constituents into said stripping step, rejecting absorbent-oil residuum from said distillation, and effecting the stripping in the stripping step substantially solely by the steam and volatiles from the distillation step for the minor portion.

4. In a process for the recovery of light oil vapors from coke oven gas containing the same by means of an absorbent oil, that is recycled in sequence through a step for absorbing light-oil vapors from said gas and a step for stripping so-absorbed light oil from said absorbent oil by direct contact with steam, and that in the course of said recycling accumulates undistillable contaminant which reduces its effectiveness in said absorption step; reconditioning said contaminants-containing absorbent oil by the steps of, preheating the absorption oil from the absorption step prior to entering the stripping step to a temperature of 200° C., withdrawing from near the absorbent oil entrance end of said stripping step a minor portion of the recycled wash oil that has been previously preheated to at least 200° C. and flowing therethrough a quantity of low pressure superheated steam that is substantially sufficient to volatilize the oily portion of the so-withdrawn absorbent oil and to leave said contaminants as residuum, and flowing such steam and volatilized constituents into the absorbent oil exit end of such stripping step, such steam being sufficiently superheated to avoid condensation in contact with said withdrawn absorbent oil thereby to avoid bumping and frothing of the latter, and effecting the stripping in the stripping section substantially solely by the steam and volatile portions from such minor portion.

5. In a process for the recovery of light-oil vapors from coke oven gas containing the same by means of an absorbent oil, that is recycled in sequence through a step for absorbing light-oil vapors from said gas and a step for stripping so-absorbed light oil from said absorbent oil by direct contact with steam, and that in the course of said recycling accumulates undistillable contaminant which reduces its effectiveness in said absorption step; reconditioning said contaminants-containing absorbent oil by the steps of, withdrawing from near the absorbent oil entrance end of said stripping step a minor portion of the recycled wash oil and flowing therethrough a quantity of low pressure superheated steam that is substantially sufficient to volatilize the oily portion of the so-withdrawn absorbent oil and to leave said contaminants as residuum, and flowing such steam and volatilized constituents into the absorbent oil exit end of such stripping step, such steam being sufficiently superheated to avoid condensation in contact with said withdrawn absorbent oil thereby to avoid bumping and frothing of the latter, and effecting the stripping in the stripping section substantially solely by the steam and volatile portions from such minor portion.

FRED DENIG.

REFERENCES CITED

The following references are of record in the file of this patent:

UNITED STATES PATENTS

| Number | Name | Date |
| --- | --- | --- |
| 991,205 | Hirzel | May 2, 1911 |
| 1,560,137 | Bernard | Nov. 3, 1925 |
| 1,595,683 | Burrell et al. | Aug. 10, 1926 |
| 1,675,462 | Pew | July 3, 1928 |
| 1,691,238 | Funk | Nov. 13, 1928 |
| 1,802,942 | Govers | Apr. 28, 1931 |
| 1,869,611 | Nichols et al. | Aug. 2, 1932 |
| 1,898,579 | Gard | Feb. 21, 1933 |
| 1,916,349 | Van Ackeren | July 4, 1933 |
| 2,006,411 | Rosenstein | July 2, 1935 |
| 2,129,787 | Schmalenbach | Sept. 13, 1938 |
| 2,164,593 | Rector | July 4, 1939 |
| 2,183,604 | Barton et al. | Dec. 19, 1939 |
| 2,196,878 | Stover | Apr. 9, 1940 |
| 2,218,495 | Balcar | Oct. 15, 1940 |
| 2,224,984 | Potts et al. | Dec. 17, 1940 |
| 2,262,202 | Ragatz | Nov. 11, 1941 |
| 2,299,283 | Schmalenbach | Oct. 20, 1942 |
| 2,335,162 | Shiras | Nov. 23, 1943 |

OTHER REFERENCES

"Dow Chemicals," published by Dow Chem. Co. (1934), page 32.

Dow Chemicals, a booklet, 1929, page 55.

Dow Chemicals, a booklet, 1934, page 33.

"Dowtherm for High Temperature Heat Transfer Systems," 3rd edition, 1940, obtainable from the Dow Chemical Company, Midland, Michigan.